(12) United States Patent
Tago et al.

(10) Patent No.: US 9,880,428 B2
(45) Date of Patent: Jan. 30, 2018

(54) DISPLAY DEVICE

(71) Applicant: Japan Display Inc., Minato-ku (JP)

(72) Inventors: Keiji Tago, Tokyo (JP); Kayoko Miyazaki, Tokyo (JP); Ayumi Mori, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/513,336

(22) Filed: Oct. 14, 2014

(65) Prior Publication Data

US 2015/0109567 A1  Apr. 23, 2015

(30) Foreign Application Priority Data

Oct. 18, 2013  (JP) ................................ 2013-217440

(51) Int. Cl.
| | |
|---|---|
| *G02F 1/1343* | (2006.01) |
| *G02F 1/1362* | (2006.01) |
| *G02F 1/1368* | (2006.01) |
| *G02F 1/1335* | (2006.01) |
| *G02F 1/1337* | (2006.01) |

(52) U.S. Cl.
CPC .. *G02F 1/134336* (2013.01); *G02F 1/133514* (2013.01); *G02F 1/133707* (2013.01); *G02F 2201/121* (2013.01); *G02F 2201/52* (2013.01)

(58) Field of Classification Search
CPC ... G02F 1/133707; G02F 2001/134318; G02F 2201/121; G02F 2201/52
See application file for complete search history.

(56) References Cited

U.S. PATENT DOCUMENTS

| | | | |
|---|---|---|---|
| 8,355,104 B2 | 1/2013 | Yoshida et al. | |
| 9,052,559 B2* | 6/2015 | Mori | G02F 1/134309 |
| | | | 349/106 |
| 2003/0107696 A1* | 6/2003 | Song | G02F 1/133707 |
| | | | 349/141 |
| 2007/0103629 A1 | 5/2007 | Li | |

(Continued)

FOREIGN PATENT DOCUMENTS

| | | |
|---|---|---|
| JP | 2000-267079 A | 9/2000 |
| JP | 2004-069767 A | 3/2004 |

(Continued)

OTHER PUBLICATIONS

Japanese Office Action dated Jun. 27, 2017, issued in Japanese Patent Application No. 2013-217440 (with English translation).

*Primary Examiner* — Bumsuk Won
*Assistant Examiner* — Jacob R Stern
(74) *Attorney, Agent, or Firm* — Oblon, McClelland, Maier & Neustadt, L.L.P.

(57) ABSTRACT

According to one embodiment, a display device includes a first substrate including a first pixel electrode disposed in a red color pixel, a second pixel electrode disposed in a green color pixel, and a third pixel electrode disposed in a blue color pixel, a second substrate including a common electrode having a first slit opposed to the first pixel electrode, a second slit opposed to the second pixel electrode, and a third slit opposed to the third pixel electrode, and a liquid crystal layer held between the first substrate and the second substrate, wherein at least one of an area and an area ratio of the third slit is greater than that of the first slit and the second slit.

13 Claims, 9 Drawing Sheets

(56) References Cited

U.S. PATENT DOCUMENTS

| | | | | |
|---|---|---|---|---|
| 2009/0244425 A1* | 10/2009 | Jung | ............... | G02F 1/133753 349/48 |
| 2010/0128210 A1* | 5/2010 | Mori | ............... | G02F 1/134309 349/109 |
| 2011/0001691 A1* | 1/2011 | Hashimoto | ........... | G02F 1/1393 345/87 |
| 2012/0062810 A1* | 3/2012 | Lee | .................... | G02F 1/1362 349/34 |
| 2012/0281273 A1* | 11/2012 | Shinkai | ............ | G02F 1/133615 359/315 |
| 2013/0083092 A1 | 4/2013 | Shin et al. | | |

FOREIGN PATENT DOCUMENTS

| | | |
|---|---|---|
| JP | 2006-259135 | 9/2006 |
| JP | 2006-330417 A | 12/2006 |
| JP | 2009-145424 | 7/2009 |
| JP | 2009-205088 A | 9/2009 |
| JP | 2015-079207 A | 4/2015 |
| WO | WO 2009/130819 A1 | 10/2009 |
| WO | WO 2012/002073 A1 | 1/2012 |

\* cited by examiner

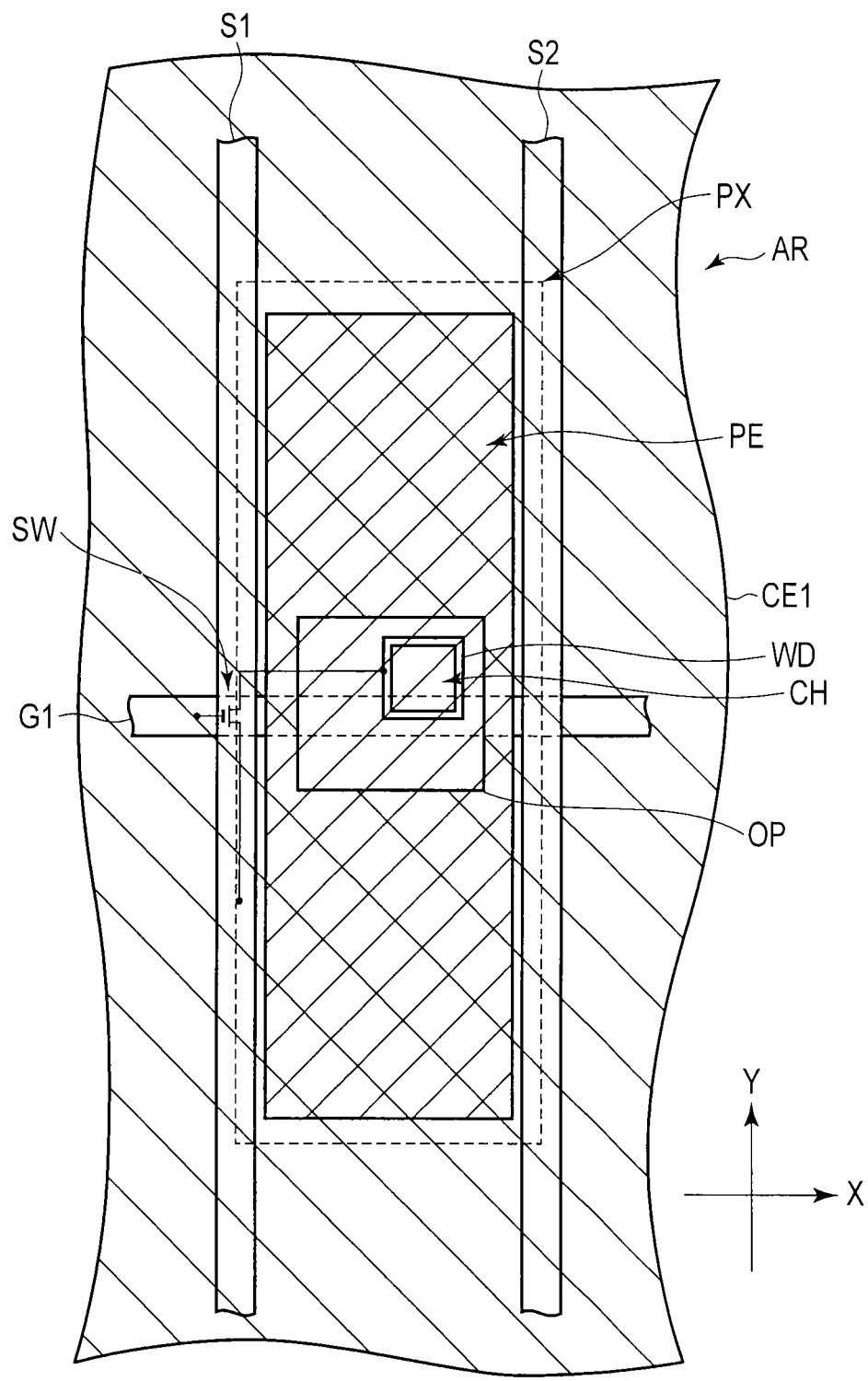
F I G. 2

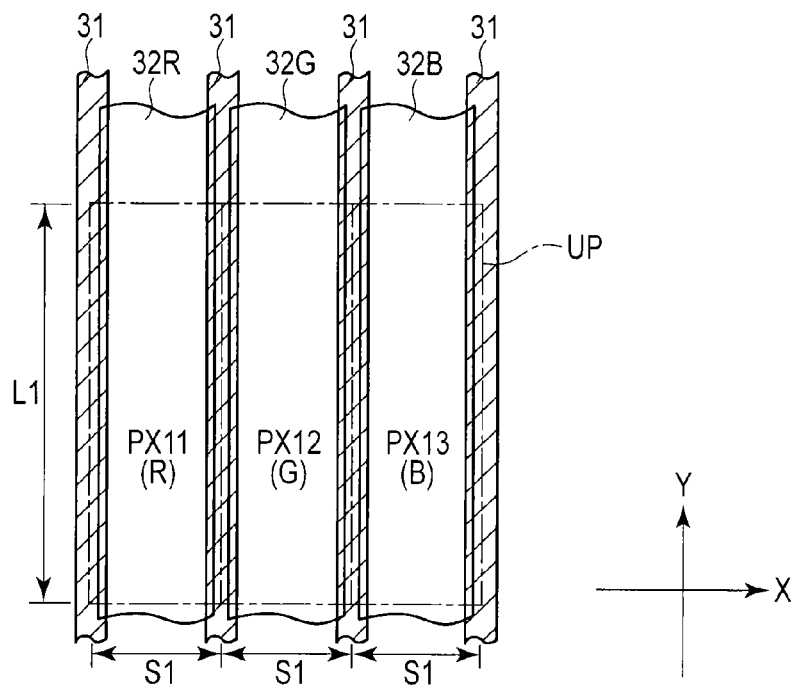
F I G. 5
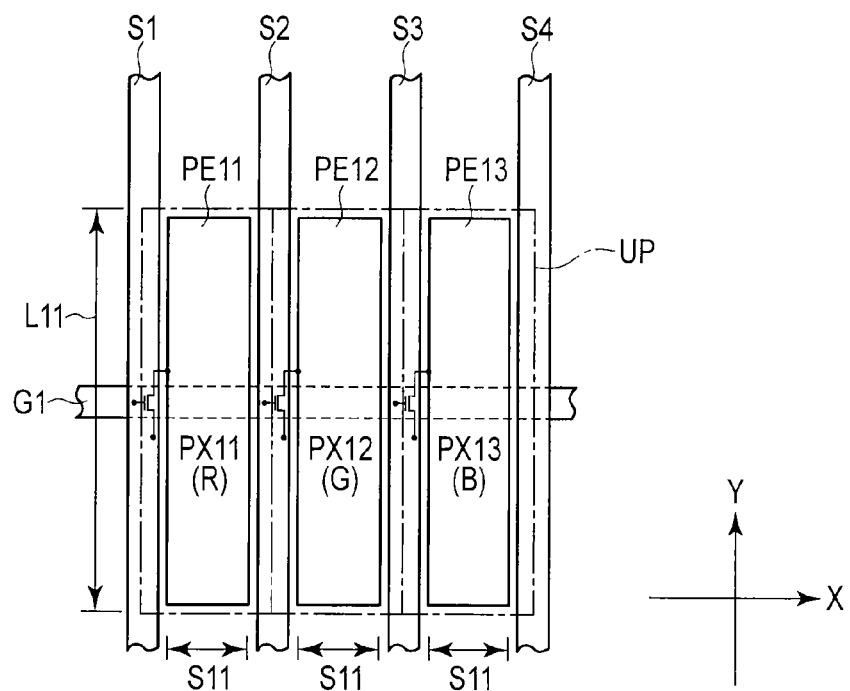
F I G. 6

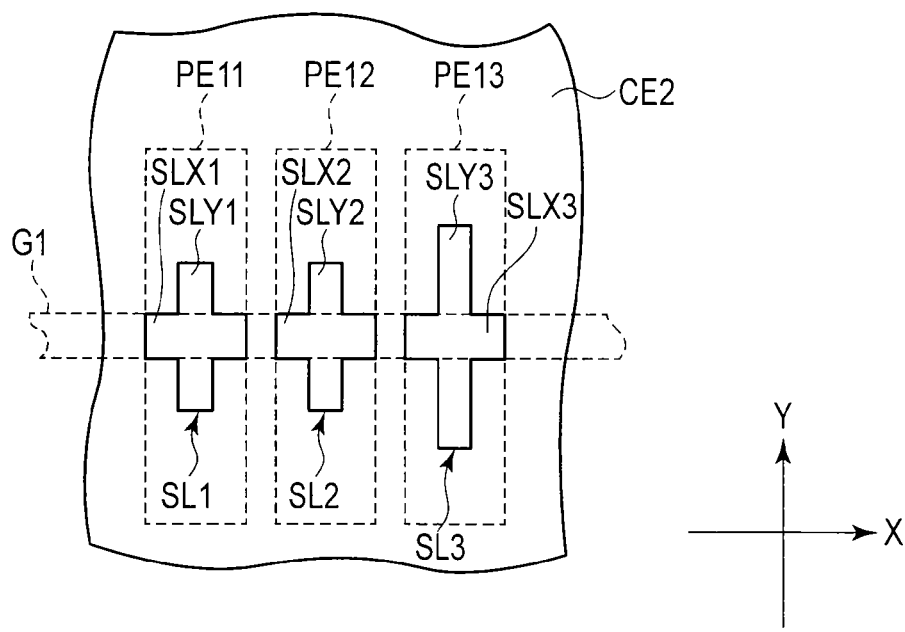
F I G. 7
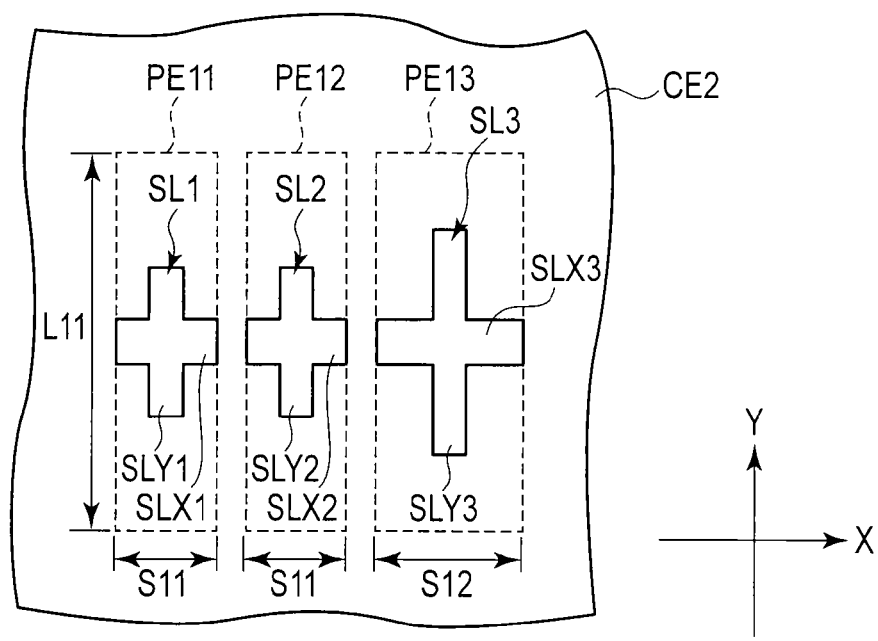
F I G. 8

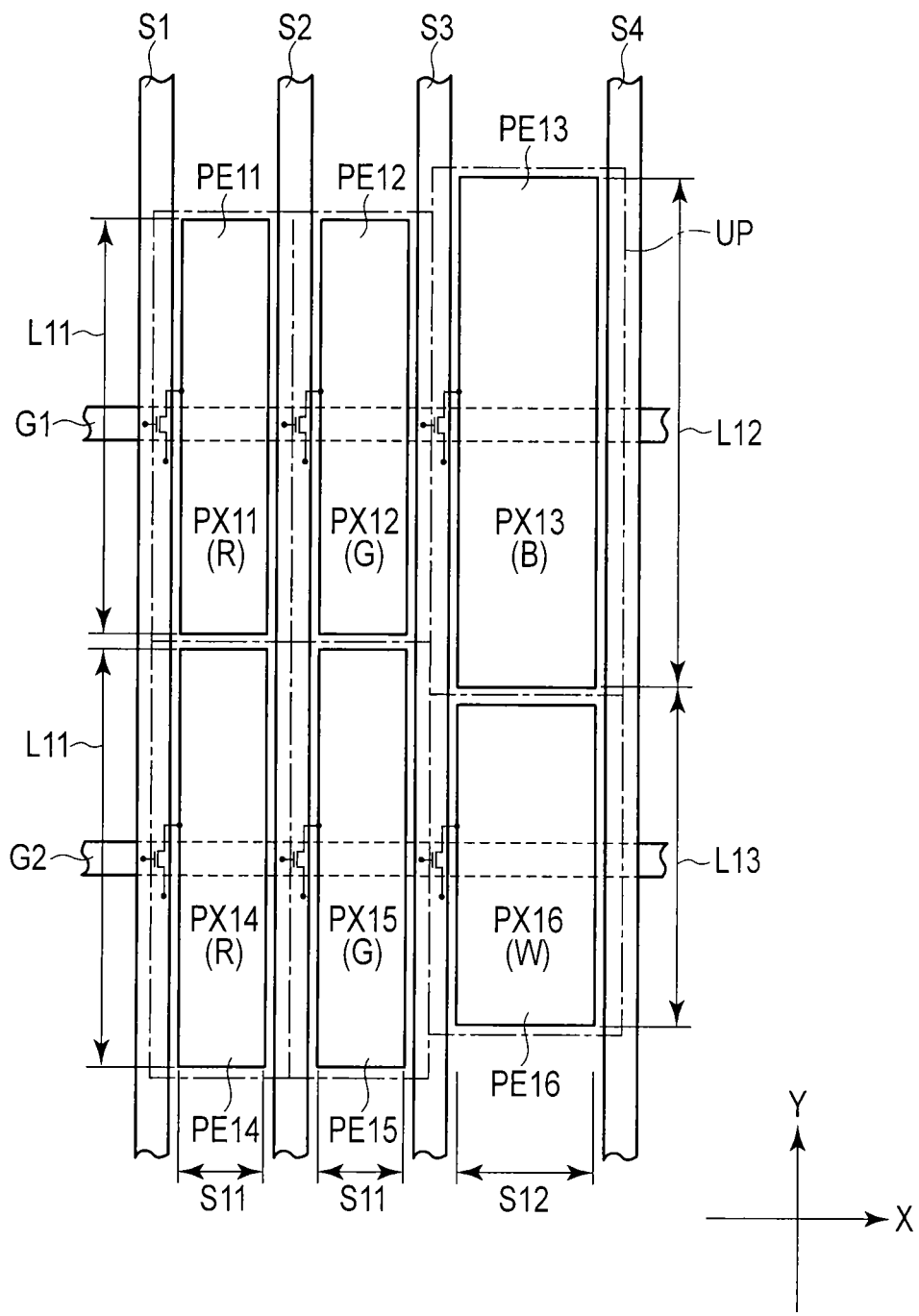
F I G. 10

DISPLAY DEVICE

CROSS-REFERENCE TO RELATED APPLICATIONS

This application is based upon and claims the benefit of priority from Japanese Patent Application No. 2013-217440, filed Oct. 18, 2013, the entire contents of which are incorporated herein by reference.

FIELD

Embodiments described herein relate generally to a display device.

BACKGROUND

In recent years, methods for improving the display luminance of a color display device have been proposed. As an example, there is a liquid crystal display device with a unit pixel in which red (R) color pixel, green (G) color pixel, blue (B) color pixel, and white (W) color pixel are arranged in a predetermined order along a row direction.

Each of the color pixels of the unit pixel has a unique transmittance characteristic with respect to an applied voltage, which is referred to the V-T characteristic. Thus, there may be a case where peak transmittance is obtained at different voltages in these color pixels. In particular, the V-T characteristic of the blue color pixel differs greatly from those of red and green color pixels. The peak transmittance of a blue color pixel is obtained at a relatively low voltage while the peak transmittance of each of a red color pixel and a green color pixel is obtained at a relatively high voltage. Thus, a voltage value is set for each color pixel based on its peak transmittance in order to maintain a white balance.

BRIEF DESCRIPTION OF THE DRAWINGS

FIG. 2 is a plan view which schematically illustrates a structure example of one pixel PX of an array substrate AR which is applicable to the display device of the embodiment.

FIG. 5 is a plan view which schematically illustrates an example of a layout of pixels and color filters in the embodiment.

FIG. 6 is a plan view which schematically illustrates a structure example of an array substrate AR to which the color filters shown in FIG. 5 are applied.

FIG. 7 is a plan view which schematically illustrates a structure example of a second common electrode CE2 disposed in a counter substrate CT opposed to the array substrate AR shown in FIG. 6.

FIG. 8 is a plan view which schematically illustrates another structure example of the second common electrode CE2.

FIG. 10 is a plan view which schematically illustrates a structure example of an array substrate AR to which the color filters shown in FIG. 9 are applied.

DETAILED DESCRIPTION

Figure 1:
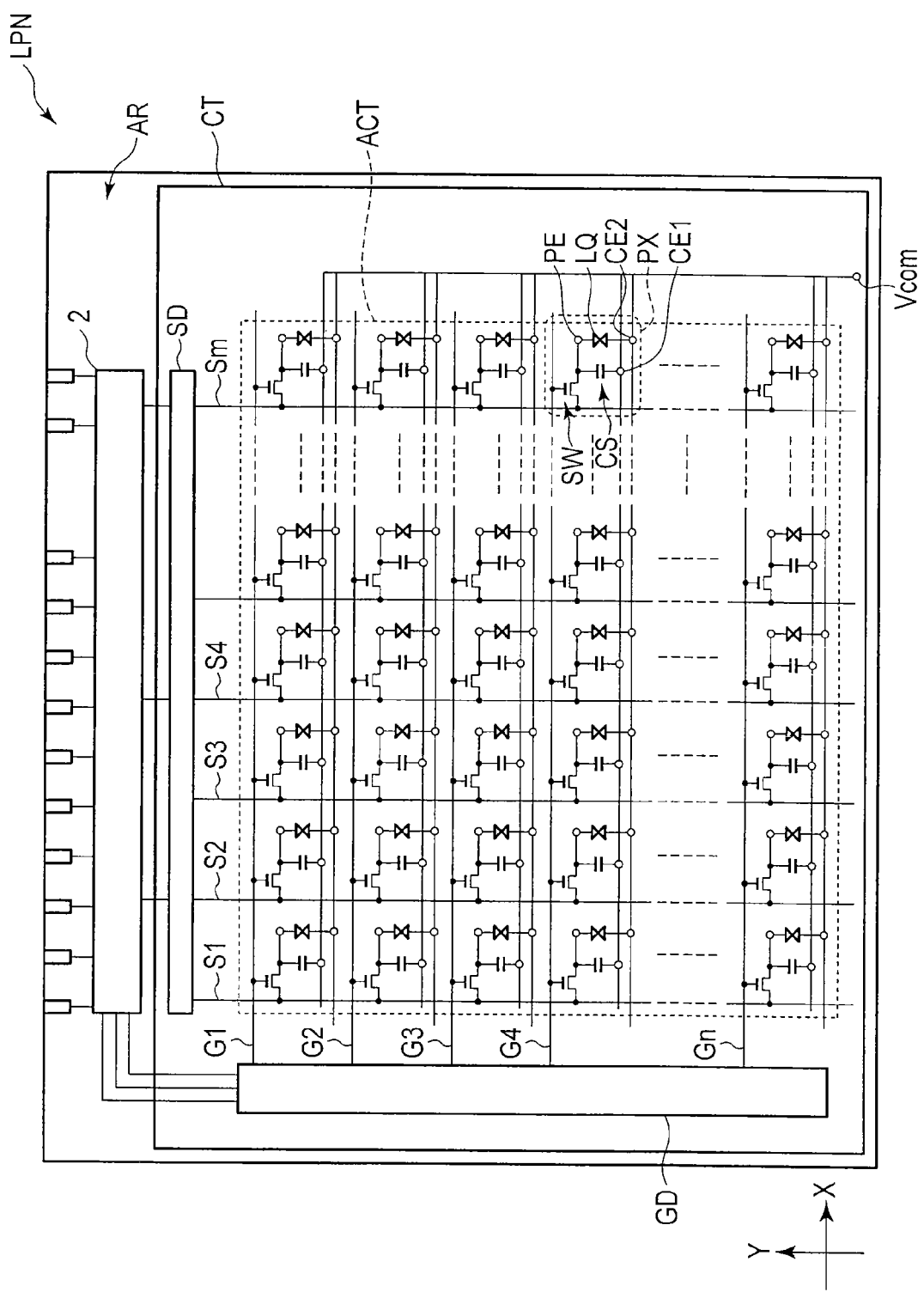
FIG. 1 is a view which schematically illustrates a structure and an equivalent circuit of a liquid crystal display panel LPN which constitutes a display device according to an embodiment.

In general, according to one embodiment, disclosed is a display device including a first substrate including a first pixel electrode disposed in a red color pixel, a second pixel electrode disposed in a green color pixel, and a third pixel electrode disposed in a blue color pixel, a second substrate including a common electrode having a first slit opposed to the first pixel electrode, a second slit opposed to the second pixel electrode, and a third slit opposed to the third pixel electrode, and a liquid crystal layer held between the first substrate and the second substrate, wherein at least one of an area and an area ratio of the third slit is greater than that of the first slit and the second slit.

According to another embodiment, disclosed is a display device including a first substrate including a first common electrode, an interlayer insulating film covering the first common electrode, a first pixel electrode opposed to the first common electrode on the interlayer insulating film and disposed in a red color pixel, a second pixel electrode opposed to the first common electrode on the interlayer insulating film and disposed in a green color pixel, and a third pixel electrode opposed to the first common electrode on the interlayer insulating film and disposed in a blue color pixel, a second substrate including a second common electrode having a first slit opposed to the first pixel electrode, a second slit opposed to the second pixel electrode, and a third slit opposed to the third pixel electrode, the second common electrode being equal in potential to the first common electrode, and a liquid crystal layer held between the first substrate and the second substrate, wherein at least one of an area and an area ratio of the third slit is greater than that of the first slit and the second slit.

Embodiments will now be described in detail with reference to the accompanying drawings. In the drawings, structural elements having the same or similar functions are denoted by like reference numbers, and an overlapping description is omitted.

FIG. 1 is a view which schematically shows a structure and an equivalent circuit of a liquid crystal display panel LPN which constitutes a display device according to an embodiment.

Specifically, the display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT corresponds to a region where the liquid crystal layer LQ is held between the array substrate AR and the counter-substrate CT, has a rectangular shape, for instance, and is composed of a plurality of pixels PX which are arrayed in a matrix.

The array substrate AR includes, in the active area ACT, a plurality of gate lines G (G1 to Gn) extending in a first direction X, a plurality of source lines S (S1 to Sm) extending in a second direction Y crossing the first direction X, a switching element SW which is electrically connected to the gate line G and source line S in each pixel PX, a pixel electrode PE which is electrically connected to the switching element SW in each pixel PX, and a first common electrode CE1 which is opposed to the pixel electrode PE. A storage capacitor CS is formed, for example, between the first common electrode CE1 and the pixel electrode PE.

On the other hand, the counter-substrate CT includes, for example, a second common electrode CE2 which is opposed to the pixel electrode PE via the liquid crystal layer LQ.

Each of the gate lines G is led out to the outside of the active area ACT and is connected to a first driving circuit GD. Each of the source lines S is led out to the outside of the active area ACT and is connected to a second driving circuit SD. At least parts of the first driving circuit GD and second driving circuit SD are formed on, for example, the array substrate AR, and are connected to a driving IC chip 2. The driving IC chip 2 incorporates a controller which controls the first driving circuit GD and second driving circuit SD, and functions as a signal supply source for supplying necessary signals for driving the liquid crystal display panel LPN. In the example illustrated, the driving IC chip 2 is mounted on the array substrate AR, on the outside of the active area ACT of the liquid crystal display panel LPN.

The first common electrode CE1 and second common electrode CE2 have the same potential, and each of them extends over substantially the entirety of the active area ACT and is formed commonly over a plurality of pixels PX. The first common electrode CE1 and second common electrode CE2 are led out to the outside of the active area ACT and are connected to a power supply module Vcom. The power supply module Vcom is formed, for example, on the array substrate AR on the outside of the active area ACT, and is electrically connected to the first common electrode CE1 and also electrically connected to the second common electrode CE2 via an electrically conductive member (not shown). At the power supply module Vcom, for example, a common potential is supplied to the first common electrode CE1 and second common electrode CE2.

FIG. 2 is a plan view which schematically shows a structure example of one pixel PX of the array substrate AR which is applicable to the display device of the embodiment.

The array substrate AR includes a gate line G1, a source line S1, a source line S2, a switching element SW, a first common electrode CE1, and a pixel electrode PE. In the example illustrated, as indicated by a broken line in FIG. 2, the pixel PX has a rectangular shape with a pair of short sides parallel to the first direction X, and a pair of long sides parallel to the second direction Y.

The gate line G1 extends linearly in the first direction X. The source line S1 and source line S2 are disposed with a distance in the first direction X, and extend linearly in the second direction Y, respectively. The length of the pixel PX in the first direction X is substantially equal to the pitch of neighboring source lines in the first direction X. The length of the pixel PX in the second direction Y is substantially equal to the pitch of neighboring gate lines in the second direction Y.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The gate line G1 is disposed in a manner to cross a central portion of the pixel PX. In the present embodiment, as illustrated, there is no storage capacitance line which crosses the pixel PX for forming a storage capacitance CS.

The switching element SW is composed of, for example, an n-channel thin-film transistor (TFT). Although a detailed illustration is omitted, the switching element SW includes a semiconductor layer of, for example, polysilicon, a gate electrode electrically connected to the gate line G1, a source electrode which is electrically connected to the source line S1 and is in contact with the semiconductor layer, and a drain electrode WD which is in contact with the semiconductor layer.

As indicated by lower-right hatching lines in the Figure, the first common electrode CE1 is disposed over substantially the entirety of the pixel PX, and further extends from the pixel PX beyond the source line S1 and source line S2 in the first direction X and extends in the second direction Y. Specifically, the first common electrode CE1 is opposed to the source line S1 and source line S2 and is formed continuously over pixels neighboring the pixel PX in the first direction X. In addition, the first common electrode CE1 is formed continuously over pixels neighboring the pixel PX in the second direction Y. Furthermore, although not described in detail, the first common electrode CE1 is disposed over substantially the entirety of the active area which displays an image, and a part thereof is led out to the outside of the active area and electrically connected to the power supply module, as described above. It should be noted, however, that an opening OP for exposing the drain electrode WD is formed in the first common electrode CE1.

In the meantime, the first common electrode CE1 may be formed such that, while the first common electrode CE1 is disposed over substantially the entirety of the pixel PX, the first common electrode CE1 is made discontinuous at an area overlapping the gate line G1, the first common electrode CE1 extends from the pixel PX over the source line S1 and source line S2 in the first direction X, the first common electrode CE1 is opposed to the source line S1 and source line S2, and the first common electrode CE1 is continuously formed in a strip shape over pixels neighboring the pixel PX in the first direction X. In this case, too, the first common electrode CE1 is led out to the outside of the active area which displays an image, and is electrically connected to the power supply module, as described above.

As indicated by upper-right hatching lines in the Figure, the pixel electrode PE is formed in an island shape in the pixel PX, and is opposed to the first common electrode CE1. Incidentally, in the example illustrated, although only the pixel electrode PE disposed in the pixel PX is depicted, pixel electrodes are also disposed in other pixels neighboring the pixel PX in the first direction X and second direction Y. The pixel electrode PE is electrically connected to the drain electrode WD of the switching element SW via a contact hole CH. The shape of the pixel electrode PE illustrated corresponds to, for example, the shape of the pixel PX, and is a rectangular shape having a less length in the first direction X than in the second direction Y. The contact hole CH is located at a substantially central part of the pixel electrode PE. Incidentally, a part of the pixel electrode PE may extend to positions overlapping the source line S1 and source line S2.

In the present embodiment, the structure of each pixel of the active area is identical to the above-described structure example. However, the active area includes pixels of different pixel sizes, i.e., different lengths in the first direction X and second direction Y.

Figure 3:
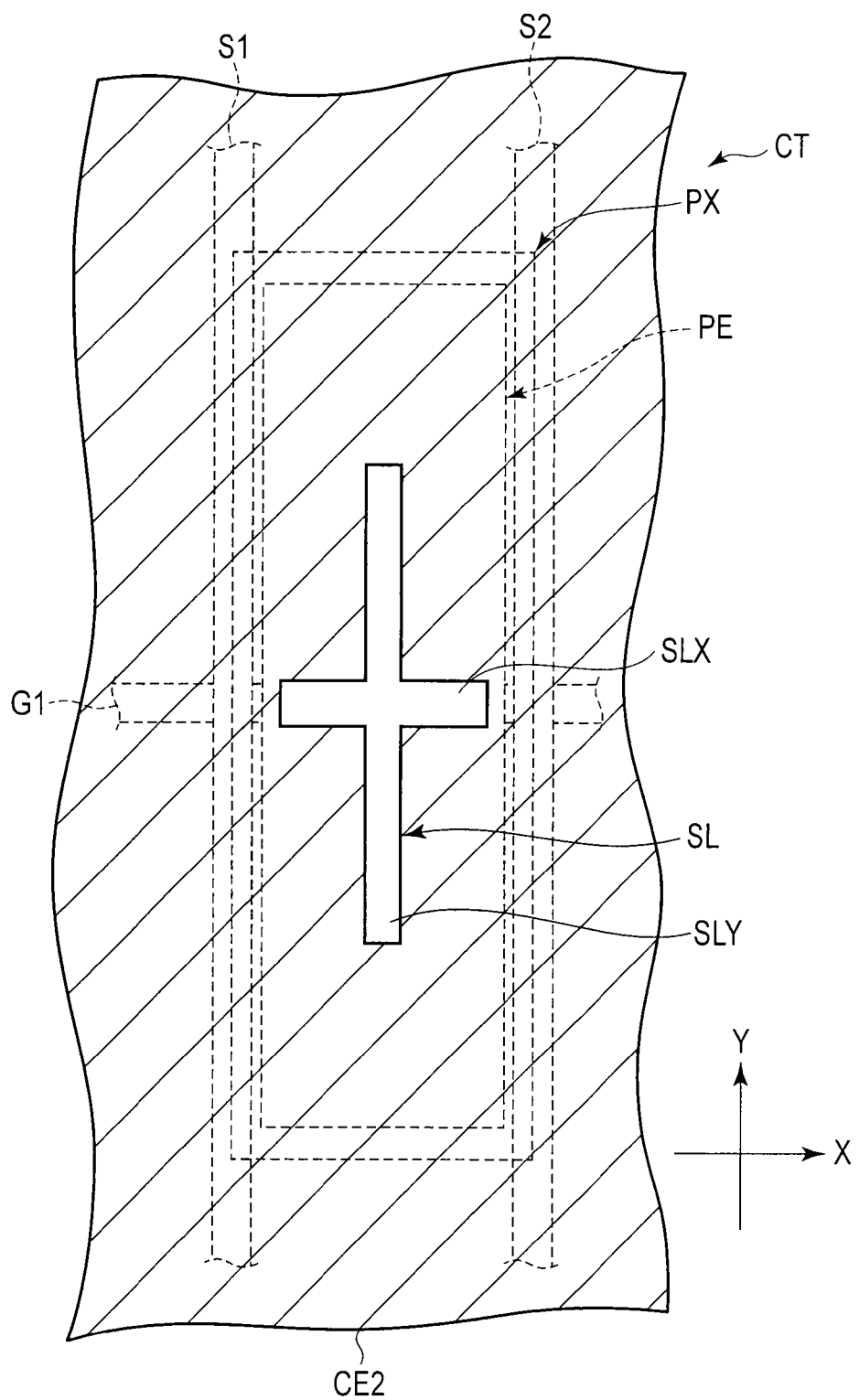
FIG. 3 is a plan view which schematically illustrates a structure example of one pixel PX of a counter-substrate CT which is applicable to the display device of the embodiment.

FIG. 3 is a plan view which schematically shows a structure example of one pixel PX of the counter-substrate CT which is applicable to the display device of the embodiment. FIG. 3 shows only structural parts that are necessary for the description, and the source line S1, source line S2, gate line G1, and pixel electrode PE, which are main parts of the array substrate, are indicated by broken lines, and the depiction of the first common electrode is omitted.

The counter-substrate CT includes a second common electrode CE2. The second common electrode CE2 is disposed in the pixel PX, and is opposed to the pixel electrode PE. In addition, the second common electrode CE2 extends from the pixel PX in the first direction X and the second direction Y, and is located also above the source line S1 and source line S2. Specifically, although not described in detail, the second common electrode CE2 is disposed continuously over pixels neighboring on the right side and left side along the first direction X of the pixel PX, and pixels neighboring on the upper side and lower side along the second direction Y of the pixel PX. Furthermore, although not described in detail, the second common electrode CE2 is disposed over almost the entirety of the active area.

A slit SL is formed in the second common electrode CE2 at a position opposed to the pixel electrode PE. In the example illustrated, the slit SL is formed in a cross shape having a transverse slit SLX extending in the first direction X and a longitudinal slit SLY extending in the second direction Y, and is located at a substantially central part of the pixel PX. The transverse slit SLX and the longitudinal slit SLY cross at the substantially central part of the pixel PX. The distance between the longitudinal slit SLY and one of the short sides of the pixel electrode PE in the second direction Y is equal to the distance between the longitudinal slit SLY and the other of the short sides of the pixel electrode PE in the second direction Y. Such a slit SL functions mainly as an alignment controller which controls the alignment of the liquid crystal molecules. The shape of the slit SL is not limited to the example illustrated and may be formed in an elongated shape extending only in the second direction Y. Furthermore, the transverse slit SLX can suppress a loss in aperture ratio if it is disposed to overlap gate line G1.

Figure 4:
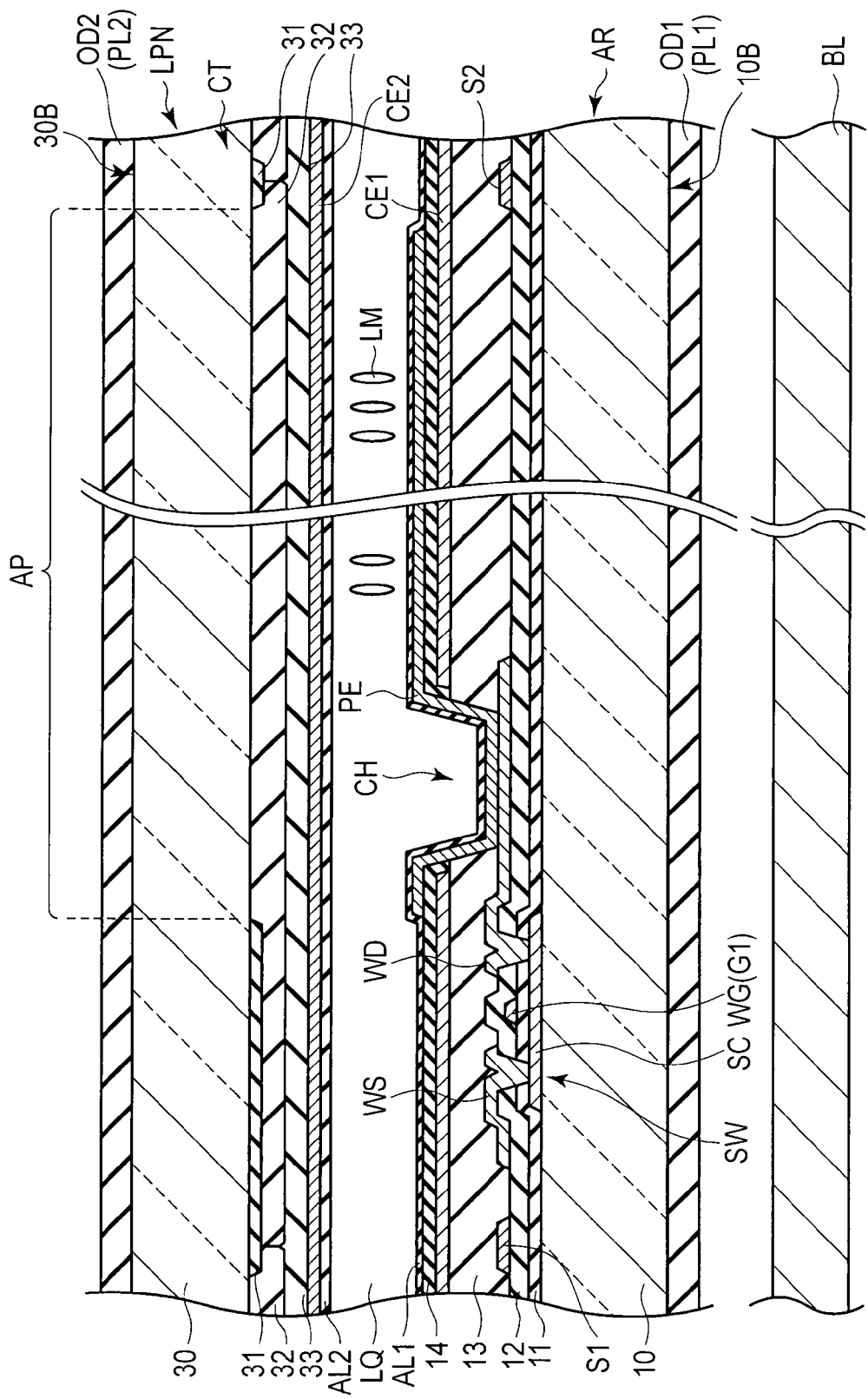
FIG. 4 is a view which schematically illustrates a cross-sectional structure of the liquid crystal display panel LPN in an active area including a switching element SW shown in FIG. 2.

FIG. 4 is a view which schematically illustrates a cross-sectional structure of the liquid crystal display panel LPN in the active area including the switching element SW shown in FIG. 2.

The array substrate AR is formed by using a first insulative substrate 10 having light transmissivity, such as a glass substrate or a resin substrate. The array substrate AR includes, on that side of the first insulative substrate 10, which is opposed to the counter-substrate CT, a switching element SW, a first common electrode CE1, a pixel electrode PE, a first insulating film 11, a second insulating film 12, a third insulating film 13, a fourth insulating film 14, and a first vertical alignment film AL1.

In the example illustrated, the switching element SW is a thin-film transistor of a top gate type. The switching element SW includes a semiconductor layer SC which is disposed on the first insulative substrate 10. In the meantime, an undercoat layer, which is an insulating film, may be interposed between the first insulative substrate 10 and the semiconductor layer SC. The semiconductor layer SC is covered with the first insulating film 11. The first insulating film 11 is also disposed on the first insulative substrate 10. This first insulating film 11 is formed of, for example, an inorganic material such as silicon nitride.

A gate electrode WG of the switching element SW is formed on the first insulating film 11, and is located immediately above the semiconductor layer SC. The gate electrode WG is electrically connected to gate line G1 (or formed integral with the gate line G1) and is covered with the second insulating film 12. The second insulating film 12 is also disposed on the first insulating film 11. This second insulating film 12 is formed of, for example, an inorganic material such as tetraethoxysilane (TEOS).

A source electrode WS and a drain electrode WD of the switching element SW are formed on the second insulating film 12. The source line S1 and source line S2 are similarly formed on the second insulating film 12. The source electrode WS illustrated is electrically connected to the source line S1 (or formed integral with the source line S1). The source electrode WS and drain electrode WD are put in contact with the semiconductor layer SC via contact holes penetrating the first insulating film 11 and second insulating film 12. The switching element SW with this structure, as well as the source line S1 and source line S2, is covered with the third insulating film 13. The third insulating film 13 is also disposed on the second insulating film 12. This third insulating film 13 is formed of, for example, a transmissive resin material.

The first common electrode CE1 extends over the third insulating film 13. As illustrated in the Figure, the first common electrode CE1 covers the upper side of the source line S1 and source line S2, and extends toward neighboring pixels. The first common electrode CE1 is formed of a transmissive, electrically conductive material such as indium tin oxide (ITO) or indium zinc oxide (IZO). The fourth insulating film 14 is disposed on the first common electrode CE1. A contact hole CH, which penetrates to the drain electrode WD, is formed in the third insulating film 13 and fourth insulating film 14. The fourth insulating film 14 has a less thickness than the third insulating film 13, and is formed of, for example, an inorganic material such as silicon nitride. The fourth insulating film 14 corresponds to an interlayer insulating film which covers the first common electrode CE1.

The pixel electrode PE is formed in an island shape on the fourth insulating film 14 and is opposed to the first common electrode CE1. The pixel electrode PE is electrically connected to the drain electrode WD of the switching element SW via the contact hole CH. This pixel electrode PE is formed of a transmissive, electrically conductive material such as ITO or IZO. The pixel electrode PE is covered with the first vertical alignment film AL1.

On the other hand, the counter-substrate CT is formed by using a second insulative substrate 30 with light transmissivity, such as a glass substrate or a resin substrate. The counter-substrate CT includes, on that side of the second insulative substrate 30, which is opposed to the array substrate AR, a light-shield layer 31, color filters 32, an overcoat layer 33, a second common electrode CE2, and a second vertical alignment film AL2.

The light-shield layer 31 partitions each pixel PX in the active area ACT, and forms an aperture portion AP. The light-shield layer 31 is provided at boundaries between color pixels, or at positions opposed to the source lines provided on the array substrate AR. The light-shield layer 31 is formed of a light-shielding metallic material or a black resin material.

The color filter 32 is formed in the aperture portion AP, and a part thereof overlaps the light-shield layer 31. The color filters 32 include a red color filter formed of a resin material which is colored in red, a green color filter formed of a resin material which is colored in green, and a blue color filter formed of a resin material which is colored in blue. The red color filter is disposed in a red color pixel which displays red, the green color filter is disposed in a green color pixel which displays green, and the blue color filter is disposed in a blue color pixel which displays blue. In addition, a white (or transmissive) color filter is disposed in a white color pixel which displays white. Incidentally, no color filter may be disposed in the white color pixel. In addition, the white color filter may not strictly be an achromatic color filter, and may be a color filter which is lightly colored (for example, colored in light yellow). Boundaries between the color filters 32 of different colors are located at positions overlapping the light-shield layer 31 above the source lines S.

The overcoat layer 33 covers the color filters 32. The overcoat layer 33 planarizes asperities of the light-shield layer 31 and color filters 32. The overcoat layer 33 is formed of, for example, a transmissive resin material. This overcoat layer 33 serves as an underlayer of the second common electrode CE2.

The second common electrode CE2 is formed on that side of the overcoat layer 33, which is opposed to the array substrate AR. As illustrated in the Figure, the second common electrode CE2 extends above the source line S1 and source line S2, and extends toward the neighboring pixels. The second common electrode CE2 is formed of, for example, a transmissive, electrically conductive material such as ITO or IZO. The second common electrode CE2 is covered with the second vertical alignment film AL2.

The first vertical alignment film AL1 and second vertical alignment film AL2 are formed of a material which exhibits vertical alignment properties, and have an alignment restriction force which aligns liquid crystal molecules in a normal direction of the substrate, without requiring alignment treatment such as rubbing.

The above-described array substrate AR and counter-substrate CT are disposed such that their first vertical alignment film AL1 and second vertical alignment film AL2 are opposed to each other. In this case, a predetermined cell gap is created between the array substrate AR and the counter-substrate CT by columnar spacers which are formed on one of the array substrate AR and counter-substrate CT. The array substrate AR and counter-substrate CT are attached by a sealant in the state in which the cell gap is created. The liquid crystal layer LQ is sealed between the first vertical alignment film AL1 and second vertical alignment film AL2. This liquid crystal layer LQ is composed of a liquid crystal composition with a negative dielectric constant anisotropy (negative-type).

A backlight unit BL is disposed on the rear side of the liquid crystal display panel LPN having the above-described structure. Various modes are applicable to the backlight unit BL, but a description of the detailed structure of the backlight unit BL is omitted here.

A first optical element OD1 including a first polarizer PL1 is disposed on an outer surface 10B of the first insulative substrate 10. A second optical element OD2 including a second polarizer PL2 is disposed on an outer surface 30B of the second insulative substrate 30. The first polarizer PL1 and second polarizer PL2 are disposed, for example, in a positional relationship of crossed Nicols in which their polarization axes are perpendicular to each other.

FIG. 5 is a plan view which schematically illustrates an example of a layout of pixels and color filters in the embodiment. In this example, the first direction X and second direction Y are perpendicular to each other.

A unit pixel for realizing color display is composed of a plurality of different color pixels. The unit pixel is a minimum unit which constitutes a color image that is displayed on the active area. In this example, one unit pixel UP, which is arranged in the first direction X, is illustrated. The unit pixel UP is composed of three color pixels.

That is, the unit pixel UP is composed of a color pixel (first color pixel) PX11, a color pixel (second color pixel) PX12, and a color pixel (third color pixel) PX13. In the Figure, each color pixel has a rectangular shape with a pair of short sides in the first direction X, and a pair of long sides in the second direction Y, and each color pixel is indicated by a one-dot-and-dash line. The color pixel PX12 is a pixel of a color different from the color of the color pixel PX11 and neighbors the color pixel PX11 in the first direction X. The color pixel PX13 is a pixel of a color different from the colors of the color pixel PX11 and color pixel PX12 and neighbors the color pixel PX12 in the first direction X. Here, the color pixel PX11 is a red color pixel (R), the color pixel PX12 is a green color pixel (G), and the color pixel PX13 is a blue color pixel (B).

Each of the color pixel PX11, color pixel PX12, and color pixel PX13 has a long-side length L1 in the second direction Y. Furthermore, each of the color pixel PX11, color pixel PX12, and color pixel PX13 has a short-side length S1 in the first direction X. In such a structure, the color pixel PX11, color pixel PX12, and color pixel PX13 are substantially equal in area.

The light-shield layer 31 is disposed at each boundary between color pixels. Each light-shield layer 31 extends linearly in the second direction Y.

A color filter (first color filter) 32R is formed in a strip shape extending in the second direction Y to correspond to the color pixel PX11. A color filter (second color filter) 32G neighbors the color filter 32R in the first direction X, and is formed in a strip shape extending in the second direction Y to correspond to the color pixel PX12. A color filter (third color filter) 32B neighbors the color filter 32G in the first direction X, and is formed in a strip shape extending in the second direction Y to correspond to the color pixel PX13. The color filters 32R, 32G, and 32B have an equal width in the first direction X.

The color filter 32R is a red (R) color filter. The color filter 32G is a green (G) color filter. The color filter 32B is a blue (B) color filter. The color filters 32R, 32G, and 32B have mutually neighboring end portions overlapping the light-shield layers 31.

FIG. 6 is a plan view which schematically illustrates a structure example of an array substrate AR to which the color filters shown in FIG. 5 are applied. In this example, only the structure of the array substrate AR, which is necessary for the description, is illustrated, and depiction of the first common electrode CE1, etc. is omitted.

A gate line G1 extends in the first direction X and crosses central portions of the color pixel PX11, color pixel PX12, and color pixel PX13. A pixel electrode (first pixel electrode) PE11 is disposed to correspond to the color pixel PX11, and is electrically connected to a source line S1 via a switching element which is electrically connected to the gate line G1. A pixel electrode (second pixel electrode) PE12 is disposed to correspond to the color pixel PX12 and neighbors the pixel electrode PE11 in the first direction X. The pixel electrode PE12 is electrically connected to a source line S2 via a switching element which is electrically connected to the gate line G1. A pixel electrode (third pixel electrode)

PE13 is disposed to correspond to the color pixel PX13 and neighbors the pixel electrode PE12 in the first direction X. The pixel electrode PE13 is electrically connected to a source line S3 via a switching element which is electrically connected to the gate line G1.

Each of the pixel electrode PE11, pixel electrode PE12, and pixel electrode PE13 has a long-side length L11 in the second direction Y. Furthermore, each of the pixel electrode PE11, pixel electrode PE12, and pixel electrode PE13 has a short-side length S11 in the first direction X. In such a structure, the pixel electrode PE11, pixel electrode PE12, and pixel electrode PE13 are substantially equal in size (area).

The pixel electrode PE11 is opposed to the color filter 32R shown in FIG. 5. The pixel electrode PE12 is opposed to the color filter 32G shown in FIG. 5. The pixel electrode PE13 is opposed to the color filter 32B shown in FIG. 5.

FIG. 7 is a plan view which schematically illustrates a structure example of the second common electrode CE2 which is disposed in the counter-substrate CT to be opposed to the array substrate AR shown in FIG. 6.

The second common electrode CE2 is opposed to the pixel electrodes PE11, PE12, and PE13. Slit (first slit) SL1 which is opposed to the pixel electrode PE11, slit (second slit) SL2 which is opposed to the pixel electrode PE12, and slit (third slit) SL3 which is opposed to the pixel electrode PE13 are formed in the second common electrode CE2.

In the example illustrated, each of slits SL1, SL2, and SL3 is formed in a cross shape. Transverse slits SLX1, SLX2, and SLX3 extend in the first direction X aligning on the same straight line. Furthermore, transverse slits SLX1, SLX2, and SLX3 overlap the gate line G extending linearly in the first direction X.

Here, the area of slit SL3 is greater than that of the slits SL1 and SL3, individually. In the example illustrated, slits SL1, SL2, and SL3 are formed to have a substantially equal width. Furthermore, transverse slit SLX3 of slit SL3 has a length which is equivalent to that of transverse slit SLX1 of slit SL1 and that of transverse slit SLX2 of slit SL2. On the other hand, longitudinal slit SLY3 of slit SL3 is longer than longitudinal slit SLY1 of slit SL1 and longitudinal slit SLY2 of slit SL2. That is, the distance from longitudinal slit SLY3 to the short sides of pixel electrode PE13 is shorter than the distance from longitudinal slit SLY1 to the short sides of pixel electrode PE11 and the distance from longitudinal slit SLY2 to the short sides of pixel electrode PE12. Note that, if the area of slit SL3 is greater than the area of slit SL1 and the area of slit SL2, the transverse and longitudinal slits of the entire slits may be equal in length and the width of slit SL3 may be wider than the width of slit SL1 and the width of slit SL2. In that case, only longitudinal slit SLY3 of slit SL3 may be formed wide, or only transverse slit SLX3 of slit SL3 may be formed wide, or both of longitudinal slit SLY3 and transverse slit SLX3 may be formed wide. In other words, when the ratio of the area of the slits to the area of the pixel electrodes is referred to as an area ratio, the area ratio of slit SL3 is greater than that of slits SL1 and SL2, individually. This is because the pixel electrodes PE11, PE12, and PE13 are equal in area and the area of slit SL3 is greater than that of slits SL1 and SL2, individually, in the example illustrated.

Next, the operation of the display device in the embodiment is described.

In an OFF state in which no potential difference is produced between the pixel electrode PE and the first common electrode CE1 and second common electrode CE2 (i.e. a state in which no voltage is applied to the liquid crystal layer LQ), no electric field is produced between the pixel electrode PE and second common electrode CE2. Thus, as illustrated in FIG. 4, liquid crystal molecules LM included in the liquid crystal layer LQ are initially aligned substantially perpendicular to the substrate major surface (X-Y plane) between the first vertical alignment film AL1 and second vertical alignment film AL2. At this time, part of linearly polarized light from the backlight unit BL passes through the first polarizer PL1 and enters the liquid crystal display panel LPN. The polarization state of the linearly polarized light, which enters the liquid crystal display panel LPN, hardly varies when the light passes through the liquid crystal layer LQ. Thus, the linearly polarized light emerging from the liquid crystal display panel LPN is absorbed by the second polarizer PL2 that is in the positional relationship of crossed Nicols in relation to the first polarizer PL1 (black display).

In an ON state in which a potential difference is produced between the pixel electrode PE and the first common electrode CE1 and second common electrode CE2 (i.e. a state in which a voltage is applied to the liquid crystal layer LQ), a vertical electric field or an inclined electric field avoiding the slits SL is produced between the pixel electrode PE and second common electrode CE2. Thus, the liquid crystal molecules LM are aligned in a direction different from the initial alignment direction, by the effect of the vertical electric field or inclined electric field. Specifically, since negative-type liquid crystal molecules LM are aligned such that their major axes cross the electric field, the liquid crystal molecules LM are aligned in the ON state in an oblique direction or in a horizontal direction, relative to the substrate major surface.

In this ON state, the polarization state of the linearly polarized light, which enters the liquid crystal display panel LPN, varies depending on the alignment state of the liquid crystal molecules LM (or the retardation of the liquid crystal layer) when the light passes through the liquid crystal layer LQ. Thus, in the ON state, at least part of the light emerging from the liquid crystal layer LQ passes through the second polarizer PL2 (white display).

In addition, in the ON state, a storage capacitance CS is formed by the pixel electrode PE and the first common electrode CE1 that are opposed to each other via the fourth insulating film 14, and retains a necessary capacitance for displaying an image. Specifically, a pixel potential, which has been written to each pixel via the switching element SW, is retained in the storage capacitance CS for a predetermined period.

Here, in the ON state, when a retardation $\Delta nd$ of the liquid crystal layer LQ (where $\Delta n$ is refractive index anisotropy and d is equivalent to a thickness of liquid crystal layer LQ or a cell gap) is a half wavelength ($\lambda/2$), a modulation or a transmittance can be maximized. However, in the ON state in which a predetermined driving voltage is applied to the liquid crystal layer LQ, a wavelength dispersion property of the liquid crystal layer LQ shows that the retardation at the short wavelength side is greater than the retardation at the long wavelength side. That is, even if a peak transmittance is obtained in a blue color pixel, the retardation of the half wavelength cannot be obtained in a green color pixel or in a red color pixel, and the peak transmittance cannot be obtained, either. Conversely, even if the peak transmittance can be obtained in the green color pixel and red color pixel, the retardation of the half wavelength cannot be obtained in the blue color pixel. As above, a desired retardation is not always obtained in the blue, green, and red color pixels in the ON state in which the same driving voltage is applied thereto, and this causes a displacement in the V-T characteristics among the color pixels.

Considering the above, in the embodiment, the electric field is kept less effective on the liquid crystal molecules LM in the blue color pixels in the ON state in order to suppress an average obliquity of the liquid crystal molecules LM aligning in the blue color pixel.

In the embodiment with a structure in which the area of slit SL3 in the blue color pixel is greater than the area of slit SL1 in the red color pixel and the area of slit SL2 in the green color pixel, the average obliquity of the liquid crystal molecules LM in the blue color pixel is kept less than the average obliquity of the liquid crystal molecules LM in the red and green color pixels. That is, the liquid crystal molecules LM in the area overlapping the slit SL3 are, even in the ON state, kept in a substantially initial alignment state and aligned substantially perpendicular to the substrate major surface. The liquid crystal molecules LM in proximity to the edge of slit SL3 or in the area overlapping the proximity of the edge of slit SL3 are aligned to slant relative to the substrate major surface due to the oblique electric field in the ON state. When the area of slit SL3 or the area ratio of slit SL3 increases in the blue color pixels, the liquid crystal molecules LM in the initially aligned state or having little obliquity increase while the liquid crystal molecules LM slanting due to the electric field decrease, and consequently, the average obliquity in the liquid crystal molecules LM can be suppressed.

Hence, even in the ON state in which the same driving voltage is applied to the pixels, the substantial retardation in the blue color pixels can be less than the retardation in the red color pixels and green color pixels. This compensates the wavelength dispersion property in the liquid crystal layer LQ and eases a displacement in the V-T characteristics among the color pixels. Therefore, a good white balance can be maintained without changing the voltage value corresponding to the peak transmittance of each color pixel significantly, and the display quality can be improved.

According to the embodiment, the capacitance, which is necessary for displaying an image in each pixel, can be formed by the pixel electrode PE and first common electrode CE1 which are opposed via the fourth insulating film 14. Thus, when the capacitance is formed, a wiring line or electrode, which crosses the pixel and is formed of a light-shielding wiring material, is needless. In addition, the fourth insulating film 14 is formed to have a smaller film thickness than the third insulating film that is formed of a resin material or the like. Therefore, a relatively large capacitance can easily be formed by the pixel electrode PE and first common electrode CE1 which are disposed via the fourth insulating film 14.

Moreover, since each of the pixel electrode PE and first common electrode CE1 is formed of a transmissive, electrically conductive material, an area overlapping the pixel electrode PE and first common electrode CE1 contributes to display. Thus, compared to a comparative example in which a storage capacitance line crossing the pixel is disposed, the aperture ratio, transmittance or luminance per pixel, which contributes to display, can be improved. Therefore, while the capacitance necessary for display is secured, the display quality can be improved.

In addition, the first common electrode CE1 extends above the source line S1 and source line S2. Thus, in the ON state, an undesired leak electric field from the source line toward the liquid crystal layer LQ can be shielded by the first common electrode CE1. Specifically, it is possible to suppress formation of an undesired electric field or an undesired capacitance between the source line and the pixel electrode PE or second common electrode CE2, and to suppress disturbance in alignment of liquid crystal molecules LM in an area overlapping the source line.

Furthermore, the liquid crystal molecules LM in the area overlapping the source line maintains the initial alignment state even in the ON state, since the first common electrode CE1 and second common electrode CE2 are kept at the same potential. Therefore, pixel electrodes PE neighboring in the first direction X can be located closer to each other up to a processing limit, and the area which contributes to display per pixel can be further increased.

Besides, even when one of the pixels neighboring with the source line interposed is in the ON state and the other is in the OFF state, there is no potential difference, by the first common electrode CE1 and second common electrode CE2, in the liquid crystal layer on the source line between the ON-state pixel and OFF-state pixel. Thus, the liquid crystal molecules LM in the area overlapping the source line are kept in the initial alignment state. Therefore, even when the liquid crystal display panel LPN is viewed in an oblique direction, degradation in display quality due to color mixing can be suppressed. In addition, since there is no need to increase the width of the light-shield layer 31 in order to prevent color mixing, the area contributing to display per pixel can be further increased.

Next, modifications will be described.

FIG. 8 is a plan view which schematically shows another structure example of the second common electrode CE2.

The structure example illustrated in FIG. 8 differs from the structure example shown in FIG. 7 in respects of the pixel electrode PE13 which is greater than the pixel electrode PE11 and the pixel electrode PE12 in size and of the slit SL3 which is greater than the slit SL1 and the slit SL2.

Specifically, each of the pixel electrode PE11, pixel electrode PE12, and pixel electrode PE13 has a long-side length L11 in the second direction Y. Furthermore, both the pixel electrode PE11 and the pixel electrode PE12 have a short-side length S11 in the first direction X while the pixel electrode PE13 has a short-side length S12 in the first direction X, which is greater than the short-side length S11. That is, the pixel electrodes PE11 and PE12 are the same in size (area) while the pixel electrode PE13 is greater than the pixel electrode PE11 and the pixel electrode PE12 in size, respectively.

The pixel electrode PE11 is opposed to the color filters 32R, the pixel electrode PE12 is opposed to the color filters 32C, and the pixel electrode PE13 is opposed to the color filters 32B.

In the second common electrode CE2, a slit (first slit) SL1 which is opposed to the pixel electrode PE11, a slit (second slit) SL2 which is opposed to the pixel electrode PE12, and a slit (third slit) SL3 which is opposed to the pixel electrode PE13. The slit SL3 has an area which is greater than that of slit SL1 and that of slit SL2. In the example illustrated, the slit SL1, slit SL2, and slit SL3 are formed to have a substantially equal width while a longitudinal slit SLY3 in the slit SL3 is greater that a longitudinal slit SLY1 of slit SL1 and a longitudinal slit SLY2 of slit SL2 and a transverse slit SLX3 of slit SL3 is greater than a transverse slit SLX1 of slit SL1 and a transverse slit SLX2 of slit SL2. Furthermore, a distance from the longitudinal slit SLY3 to the short sides of the pixel electrode PE13 is less than a distance from the longitudinal slit SLY1 to the short sides of the pixel electrode PE11 and a distance from the longitudinal slit SLY2 to the short sides of the pixel electrode PE12.

In this structure example, too, the same advantageous effects as in the above-described example can be obtained.

Figure 9:
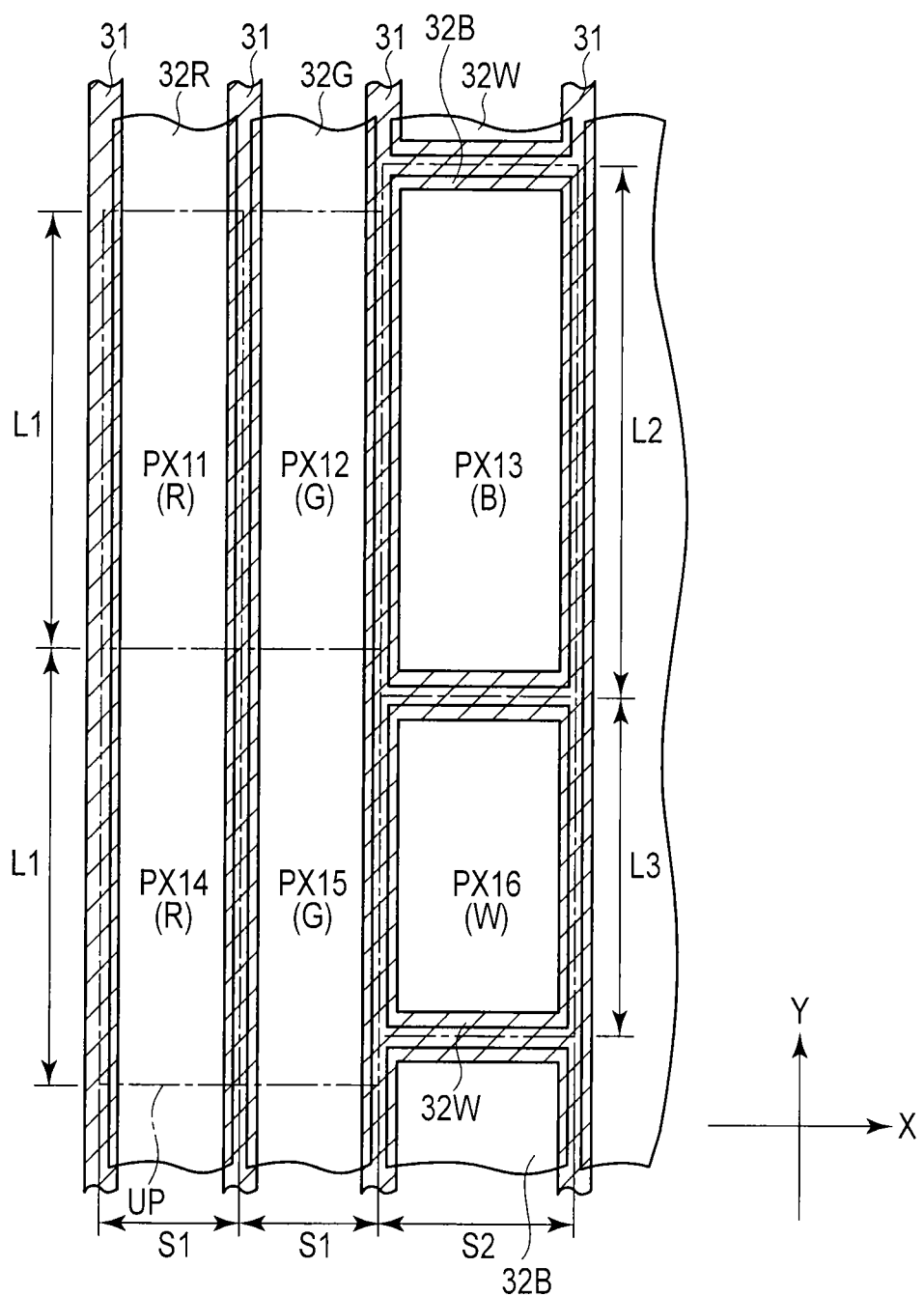
FIG. 9 is a plan view which schematically illustrates another structure example of a layout of pixels and color filters in the embodiment.

FIG. 9 is a plan view which schematically shows another structure example of a layout of pixels and color filters in the embodiment.

The structure example shown in FIG. 9 differs from the structure example shown in FIG. 5 in respects of the unit pixel UP including a white pixel in addition to the red, green, and blue color pixels.

In the example illustrated, the unit pixel UP is composed of six color pixels. Specifically, a color pixel (first color pixel) PX11, a color pixel (second color pixel) PX12, a color pixel (third color pixel) PX13, a color pixel (fourth color pixel) PX14, a color pixel (fifth color pixel) PX15, and a color pixel (sixth color pixel) PX16 constitute the unit pixel UP. In the Figure, each color pixel is a rectangular shape having a pair of short sides in the first direction X and a pair of long sides in the second direction Y, and is indicated by one-dot-and-dash line. The color pixel PX11 is a red color pixel. The color pixel PX12 is a green color pixel neighboring the color pixel PX11 in the first direction X. The color pixel PX13 is a blue color pixel neighboring the color pixel PX12 in the first direction X. The color pixel PX14 is a red color pixel neighboring the color pixel PX11 in the second direction Y. The color pixel PX15 is a green color pixel neighboring the color pixel PX12 in the second direction Y. The color pixel PX16 is a white color pixel neighboring the color pixel PX13 in the second direction Y.

Each of the color pixel PX11, color pixel PX12, color pixel PX14 and color pixel PX15 has a long-side length L1 in the second direction Y. The color pixel PX13 has a long-side length L2 in the second direction Y, which is greater than the long-side length L1. The color pixel PX16 has a long-side length L3 in the second direction Y, which is less than the long-side length L1. Each of the color pixel PX11, color pixel PX12, color pixel PX14 and color pixel PX15 has a short-side length S1 in the first direction X. Each of the color pixel PX13 and color pixel PX16 has a second short-side length S2 in the first direction X, which is greater than the short-side length S1.

In this structure, the color pixel PX11, color pixel PX12, color pixel PX14 and color pixel PX15 are substantially equal in area. The area of the color pixel PX13 is greater than the area of the color pixel PX11, etc., and is largest in the unit pixel UP1. The area of the color pixel PX16 is less than the area of the color pixel PX11, etc., and is smallest in the unit pixel UP1.

Light-shield layers 31 are disposed at boundaries of the respective color pixels. Each light-shield layer 31 extends linearly in the second direction Y. Incidentally, no light-shield layer 31 is disposed at a boundary between color pixels of the same color. Specifically, no light-shield layer 31 is disposed at a boundary between the color pixel PX11 and color pixel PX14, or between the color pixel PX12 and color pixel PX15. The light-shield layer 31 is disposed at a boundary between color pixels of different colors. Specifically, the light-shield layer 31 extending linearly in the first direction X is disposed at a boundary between the color pixel PX13 and color pixel PX16. Thus, each of the color pixel PX13 and color pixel PX16 is surrounded by the light-shield layers 31.

A color filter (first color filter) 32R is formed in a strip shape extending in the second direction Y, and is disposed corresponding to the color pixel PX11 and the color pixel PX14. A color filter (second color filter) 32G neighbors the color filter 32R in the first direction X, is formed in a strip shape extending in the second direction Y, and is disposed corresponding to the color pixel PX12 and the color pixel PX15. A color filter (third color filter) 32B neighbors the color filter 32G in the first direction X, is formed in an island shape, and is disposed corresponding to the color pixel PX13. A color filter (fourth color filter) 32W neighbors the color filter 32B in the second direction Y, neighbors the color filter 32G in the first direction X, is formed in an island shape, and is disposed corresponding to the color pixel PX16. The color filter 32B and color filter 32W are alternately disposed in the second direction Y.

The color filter 32R and color filter 32G have an equal width in the first direction X. The color filter 32B and color filter 32W have an equal width in the first direction X, and this width is greater than the width of the color filter 32R, etc.

The color filter 32R is a red (R) color filter. The color filter 32G is a green (G) color filter. The color filter 32B is a blue (B) color filter. The color filter 32W is a white (W) color filter. The first to fourth color filters have mutually neighboring end portions overlapping the light-shield layers 31.

FIG. 10 is a plan view which schematically illustrates a structure example of an array substrate AR to which the color filters shown in FIG. 9 are applied. In this example, only the structure of the array substrate AR, which is necessary for the description, is illustrated, and depiction of the first common electrode, etc. is omitted.

A gate line G1 extends in the first direction X and crosses central portions of the color pixel PX11, color pixel PX12, and color pixel PX13. A gate line G2 extends in the first direction X and crosses the central portions of the color pixel PX14, color pixel PX15, and color pixel PX16.

A pixel electrode (first pixel electrode) PE11 is disposed to correspond to the color pixel PX11, and is connected to a source line S1 via a switching element which is electrically connected to the gate line G1. A pixel electrode (second pixel electrode) PE12 is disposed to correspond to the color pixel PX12 and neighbors the pixel electrode PE11 in the first direction X. The pixel electrode PE12 is electrically connected to a source line S2 via a switching element which is connected to the gate line G1. A pixel electrode (third pixel electrode) PE13 is disposed to correspond to the color pixel PX13 and neighbors the pixel electrode PE12 in the first direction X. The pixel electrode PE13 is electrically connected to a source line S3 via a switching element which is electrically connected to the gate line G1. A pixel electrode (fourth pixel electrode) PE14 is disposed to correspond to the color pixel PX14 and neighbors the pixel electrode PE11 in the second direction Y. The pixel electrode PE14 is electrically connected to the source line S4 via a switching element which is electrically connected to a gate line G2. A pixel electrode (fifth pixel electrode) PE15 is disposed to correspond to the color pixel PX15 and neighbors the pixel electrode PE12 in the second direction Y. The pixel electrode PE15 is electrically connected to the source line S5 via a switching element which is electrically connected to the gate line G2. A pixel electrode (sixth pixel electrode) PE16 is disposed to correspond to the color pixel PX16 and neighbors the pixel electrode PE13 in the second direction Y. The pixel electrode PE16 is electrically connected to the source line S6 via a switching element which is electrically connected to the gate line G2.

Each of the pixel electrode PE11, pixel electrode PE12, pixel electrode PE14 and pixel electrode PE15 has a long-side length L11 in the second direction Y. The pixel electrode PE13 has a long-side length L12 in the second direction Y, which is greater than the long-side length L11. The pixel electrode PE16 has a long-side length L13 in the second direction Y, which is less than the long-side length L11. Each of the pixel electrode PE11, pixel electrode PE12, pixel electrode PE14 and pixel electrode PE15 has a short-side length S11 in the first direction X. Each of the pixel electrode PE13 and pixel electrode PE16 has a short-side length S12 in the first direction X, which is greater than the short-side length S11.

The pixel electrode PE11 and pixel electrode PE14 arranged in the second direction Y are opposed to the color filter 32R shown in FIG. 9. The pixel electrode PE12 and pixel electrode PE15 arranged in the second direction Y are opposed to the color filter 32G shown in FIG. 9. The pixel electrode PE13 is opposed to the color filter 32B shown in FIG. 9. The pixel electrode PE16 is opposed to the color filter 32W shown in FIG. 9.

Figure 11:
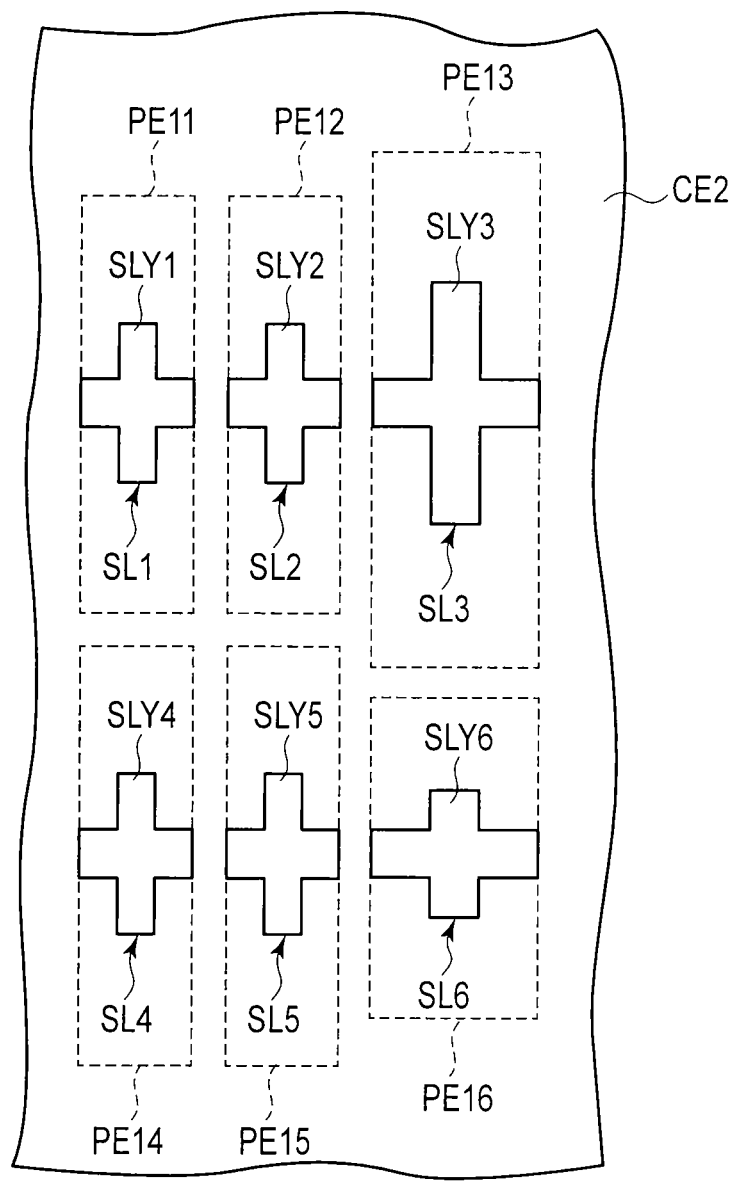
FIG. 11 is a plan view which schematically illustrates a structure example of a second common electrode CE2 which is disposed to be opposed to the array substrate AR shown in FIG. 10.

FIG. 11 is a plan view which schematically illustrates a structure example of a second common electrode CE2 which is disposed to be opposed to the array substrate AR shown in FIG. 10.

The second common electrode CE2 is opposed to the pixel electrodes PE11 to PE16. In the second common electrode CE2, a slit SL1 which is opposed to the pixel electrode PE11, a slit SL2 which is opposed to the pixel electrode PE12, a slit SL3 which is opposed to the pixel electrode PE13, a slit SL4 which is opposed to the pixel electrode PE14, a slit SL5 which is opposed to the pixel electrode PE15, and a slit SL6 which is opposed to the pixel electrode PE16 are formed.

The slit SL1, slit SL2, slit SL4, and slit SL5 are substantially equal in area. The slit SL3 is greater than the slit SL1 and slit SL2, etc. in area, and the slit SL6 is less than the slit SL1 and slit SL2 in area.

In the example illustrated, each of a longitudinal slit SLY1 in slit SL1, longitudinal slit SLY2 in slit SL2, longitudinal slit SLY4 in slit SL4, and longitudinal slit SLY5 in slit SL5 is substantially equal in length. A longitudinal slit SLY3 of slit SL3 is greater than the longitudinal slit SLY1 of slit SL1 in length. A longitudinal slit SLY6 of slit SL6 is less than the longitudinal slit SLY4 of slit SL4 in length.

Furthermore, a slit (transverse slit) of each of the slit SL1, slit SL2, and slit SL3, which extends in the first direction X is disposed to overlap the gate line G1. A slit (transverse slit) of each of the slit SL4, slit S15, and slit SL6, which extends in the first direction X is disposed to overlap the gate line G2.

In this structure example, too, the same advantageous effects as in the above-described example can be obtained.

According to this structure example, the unit pixel is composed of six color pixels of 2 rows×3 columns, four of the six color pixels have an equal pixel size, one of the other two color pixels has a largest pixel size, and the other of the other two color pixels has a smallest pixel size. Each of these six color pixels is allocated to any one of a red color pixel, a green color pixel, a blue color pixel, and a white color pixel. Two color pixels in an identical column are allocated as red color pixels. Two color pixels in an identical column are allocated as green color pixels. A color pixel of the largest pixel size is allocated as a blue color pixel, and a color pixel of the smallest pixel size is allocated as a white color pixel. The blue color pixel is located in the same column as the white color pixel.

Thus, although color pixels of four columns need to be driven in a unit pixel configuration in which four color pixels of a red color pixel, a green color pixel, a blue color pixel and a white color pixel are arranged in the first direction, it should suffice to drive color pixels of three columns in the unit pixel configuration of the present embodiment, and an increase in power consumption can be suppressed.

In addition, since the number of color pixels arranged in the first direction is three, the restriction to the pitch in the first direction of color pixels constituting the unit pixel can be relaxed, compared to the case in which the number of color pixels arranged in the first direction is four. Thus, even in the case where the length in the first direction of the unit pixel has decreased because of a demand for higher fineness, the length in the first direction of each color pixel can be set with an allowance, compared to the processing limit.

Furthermore, since the pixel size of the blue color pixel can be freely set by the short-side length in the first direction and the long-side length in the second direction, the pixel size of the blue color pixel can properly be set in accordance with the pixel size or transmittance of each of the red color pixels and color green pixels. Therefore, optimal color reproducibility can be realized.

In addition, the pixel size of the white color pixel can also be freely set by the short-side length in the first direction and the long-side length in the second direction. Thus, the display luminance of the white color pixel can be freely set in a range lower than the total luminance of the red, green and blue color pixels, and a higher luminance can be realized without degrading the color reproducibility. In addition, by substituting the display luminance of the white color pixels for the total display luminance produced by the red, green and blue color pixels, the display luminance of the unit pixels increases. Thus, the luminance of the backlight unit can be reduced by that degree, and the power consumption can be reduced. Furthermore, by virtue of the high luminance of the unit pixels, the visibility of a display image can be enhanced even in ambient light. In addition, since the pixel size of the white color pixel does not excessively increase, the white color pixels themselves are less easily discernible even when an image with a high display luminance is displayed by the white color pixels. Therefore, the display quality can be improved.

As has been described above, according to the present embodiment, a display device, which can improve display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   an array substrate including an active area in which a plurality of pixels are arranged in a matrix, a first common electrode in the active area, an interlayer insulating film covering the first common electrode, a first pixel electrode opposed to the first common electrode on the interlayer insulating film, a second pixel electrode opposed to the first common electrode on the interlayer insulating film, a third pixel electrode opposed to the first common electrode on the interlayer insulating film, and a first vertical alignment film covering the first to third pixel electrodes;
   a counter substrate including a color filter layer, a second common electrode being equal in potential to the first common electrode, and a second vertical alignment film covering the second common electrode; and a liquid crystal layer held between the first vertical alignment film and the second vertical alignment film, wherein the liquid crystal layer is formed of a liquid crystal composition with a negative dielectric constant anisotropy, the first common electrode extends over substantially the entire active area and is formed commonly over the plurality of pixels, the second common electrode is opposed to the first common electrode, extends over substantially the entire active area, and is formed commonly over the plurality of pixels, the second common electrode includes a first slit opposed to the first pixel electrode, a second slit opposed to the second pixel electrode, and a third slit opposed to the third pixel electrode, and at least one of an area and an area ratio of the third slit is greater than that of the first slit and the second slit.

2. The display device of claim 1, wherein each of the first to third slits is formed in a cross shape having a transverse slit extending in a first direction and a longitudinal slit extending in a second direction, and the longitudinal slit of the third slit has a length greater than the first and second slits.

3. The display device of claim 2, wherein the transverse slit of each of the first to third slits are aligned on the same straight line.

4. The display device of claim 2, wherein the array substrate further includes a gate line extending linearly in the first direction and overlapping the transverse slit of each of the first to third slits.

5. The display device of claim 1, wherein the first to third pixel electrodes have the same size.

6. The display device of claim 1, wherein the third pixel electrode is greater in area than the first pixel electrode and the second pixel electrode.

7. The display device of claim 1, wherein array substrate further includes a fourth pixel electrode.

8. The display device of claim 7, wherein the second common electrode further includes a fourth slit opposed to the fourth pixel electrode.

9. The display device of claim 8, wherein the fourth slit has an area less than the first slit and the second slit.

10. The display device of claim 7, wherein the first pixel electrode is disposed in a red color pixel, the second pixel electrode is disposed in a green color pixel, the third pixel electrode is disposed in a blue color pixel.

11. The display device of claim 1, wherein the liquid crystal layer is in contact with the first vertical alignment film and the second vertical alignment film.

12. The display device of claim 1, wherein the liquid crystal layer is disposed between the first common electrode and the second common electrode.

13. The display device of claim 1, wherein the array substrate further includes a first insulative substrate, the first common electrode, the interlayer insulating film, and the first to third pixel electrodes are disposed between the first insulative substrate and the first vertical alignment film, the second substrate further includes a second insulative substrate, and the color filter layer and the second common electrode are disposed between the second insulative substrate and the second vertical alignment film.

\* \* \* \* \*